United States Patent [19]

Wrue

[11] 4,187,574
[45] Feb. 12, 1980

[54] CONTACT LENS CLEANSING APPARATUS

[75] Inventor: Richard J. Wrue, Greece, N.Y.

[73] Assignee: Bausch & Lomb Incorporated, Rochester, N.Y.

[21] Appl. No.: 928,751

[22] Filed: Jul. 27, 1978

[51] Int. Cl.² ............................................. B08B 11/02
[52] U.S. Cl. ................................. 15/104.92; 15/97 R; 15/210 R
[58] Field of Search ................ 15/21 R, 21 A, 97 R, 15/210 R, 160, 214, 104.92, 104.93, 104.94

[56] References Cited

U.S. PATENT DOCUMENTS

| 1,845,315 | 2/1932 | Meikle | 15/104.92 |
| 3,056,998 | 10/1962 | Ebner | 15/104.92 X |
| 3,135,987 | 6/1964 | Huch | 15/104.92 |
| 3,378,873 | 4/1968 | Strout | 15/104.92 X |
| 3,564,636 | 2/1971 | Tomer | 15/160 |

Primary Examiner—Edward L. Roberts
Attorney, Agent, or Firm—Frank C. Parker

[57] ABSTRACT

An apparatus for the cleansing of contact lenses comprising a housing for containing a lens divided into a top portion and a bottom portion. The top portion may be joined or removed from the bottom portion. In addition, the top portion is movable while joined with the bottom portion and vice-versa. Within the top and bottom portions are scrubbing pad means which are used to scrub a contact lens when the top portion of the housing is moved in relation to the bottom portion. An offset dome is built into the bottom portion which causes the lens to migrate within the housing during scrubbing, thereby thoroughly cleansing all portions of the lens.

11 Claims, 4 Drawing Figures

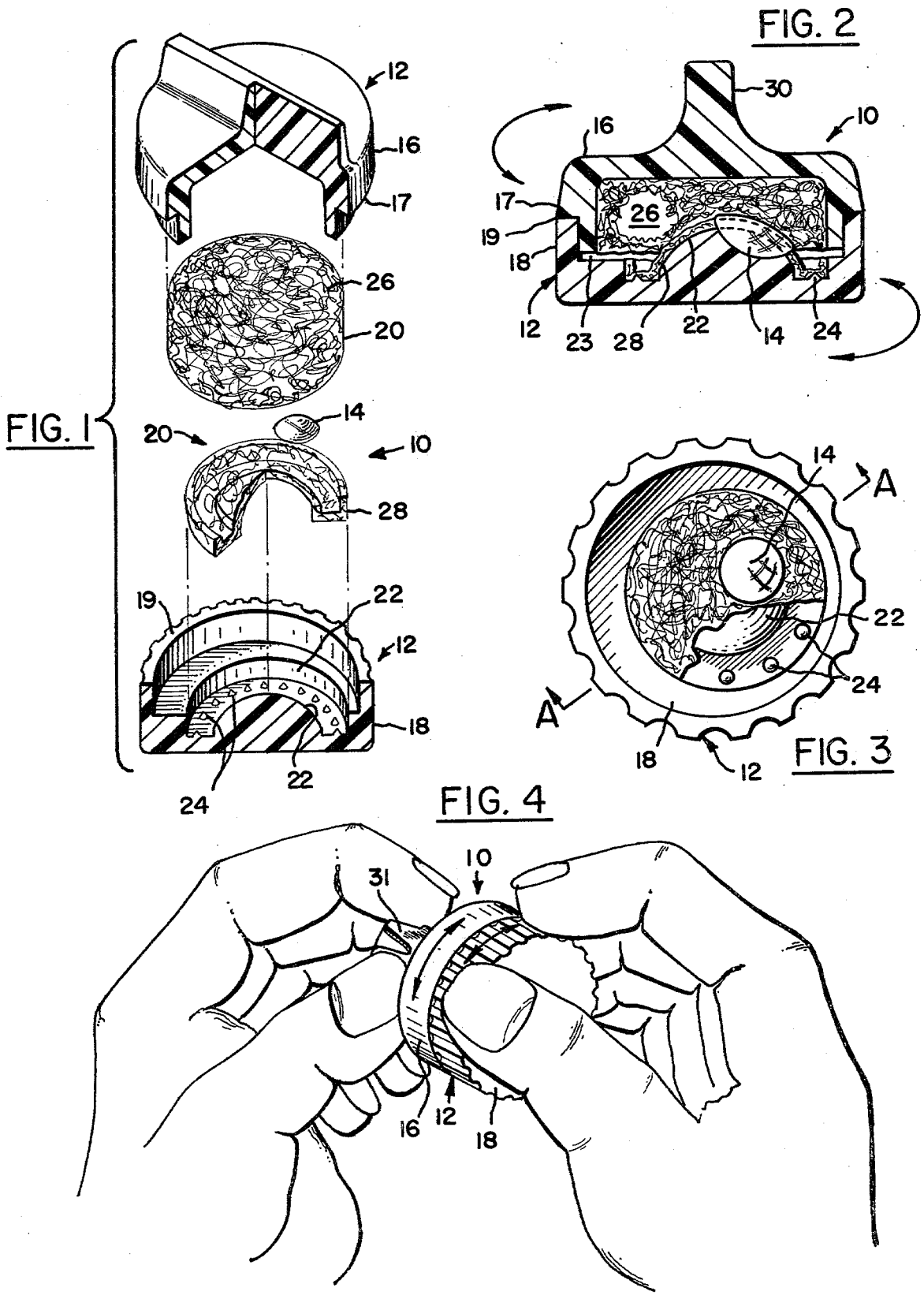

CONTACT LENS CLEANSING APPARATUS

BACKGROUND OF THE INVENTION

This invention relates to an apparatus for the physical and chemical cleansing of contact lenses, which may be of either a hard or soft composition. As is well known in the contact lens art, proper care of contact lenses is necessary to preclude contamination which is caused by foreign substances that are absorbed into or carried by the lens. Accordingly, it is imperative that users of contact lenses be apprised of the best means available with which to rid the lens of contaminants without incurring damage (scratching, folding, tearing, etc.).

It is well known that there are many different types of contact lens cleansing devices available in the marketplace for use in storing, caring and ascepticizing lenses. However, many of these devices merely chemically clean the lens and do not physically remove particulate matter and protein deposits which have penetrated into the lens surface. Examples of such devices may be found in the following list of U.S. patents:

| Title | Inventors | U.S. Pat. No. | Date of Issue |
|---|---|---|---|
| Contact lens case | R.J. Silverman | 2,940,589 | 6/14/60 |
| Contact lens Comfort case | R.G. Hollinger | 2,967,607 | 1/10/61 |
| Contact lens Comfort case | R.G. Hollinger | 2,996,171 | 8/15/61 |
| Holder for Contact lenses | E. Nathan | 3,025,950 | 7/22/60 |
| Contact lens case | L.C. Phipps, III | 3,037,616 | 6/5/62 |
| Contact lens Carrying case | W.P. Ebner | 3,056,998 | 10/9/62 |
| Lens washing Machine | R.C. Hungerford et al | 3,279,482 | 10/18/66 |
| Manual contact Lens cleaning Device | E.A. Poole | 3,586,012 | 6/22/71 |
| Contact lens Washer with lens Storage | D.G. Frantz et al | 3,623,492 | 11/30/71 |
| Contact lens Carrying case | J. Kadlecik et al | 3,977,517 | 8/31/76 |

Accordingly, it is an object of the present invention to provide a contact lens cleaning apparatus which will thoroughly and effectively remove contamination from both lens surfaces simultaneously of particulate matter accumulated on contact lenses in use without incurring damage,
  to provide such an apparatus in a form which is inexpensive to manufacture, portable and simple to use; and
  to provide such an apparatus which may be utilized for cleaning both thick and ultrathin hard and soft contact lenses without damage or deformation.

SUMMARY OF THE INVENTION

The present invention is an improved apparatus for cleansing both surfaces of a contact lens simultaneously, without adding contamination. The invention comprises a housing for containing the lens. The housing includes a top portion and a bottom portion. The top portion may be joined with or removed from the bottom portion of the housing. While joined with the housing the top portion is movable in relation thereto. Within the housing are scrubbing pads. When the top portion of the housing is moved in relation to the bottom portion, the scrubbing pads move about the contact lens contained within the housing. This motion scrubs and cleanses the lens with a consistent programmed force independent of the patient.

The invention further includes an offset dome member integrally formed in the housing. This dome member causes the contact lens to migrate from one side of the interior of the housing to the other. As a result, the entire upper and lower surfaces of the contact lenses are cleansed. There are no dead spots upon which the lens can rest whereby a portion of the lens would not be cleansed.

As a further feature of the invention, a cleansing solution is preferably dispersed within the pad in order to wash and disinfect the contact lens. This cleansing solution ordinarily consists of a saline solution and a surfactant but may contain a detergent, soap, oxidizing agent or enzyme cleaner as is commonly known in the art.

In an alternative embodiment, the housing means includes an attachment device for retaining the pads in the housing or removing them as desired. As a result, sterile pads may be removed and disposed of, and replaced with new fresh pads on an appropriately programmed basis.

In a preferred embodiment the pads comprise a top pad attached to the top portion of the housing and a bottom pad attached to the bottom portion. Upon movement of the top portion of the housing in relation to the bottom portion, the pads frictionally engage with the contact lens contained therebetween. This frictional engagement is of such a nature that it affects the scrubbing action upon the contact lens between the top and bottom pad members without preferentially frictionally fixing the lens to either surface thereby permitting a random top and bottom surface treatment.

The pad is preferably comprised of a cellular plastic non-shedding foam material, such as polyurethane foam. The foam may be reticulated or unreticulated (reticulation is the removing by air pressure of excess material within the cellular foam). In a preferred embodiment the top pad is $\frac{1}{8}$" thick and the bottom pad is $\frac{1}{4}$" thick.

In order to utilize the contact lens cleansing apparatus, a cleansing solution is dispensed onto the pads within the housing. A contact lens is placed on the pad. The top portion of the housing is joined with the bottom portion. The top portion is then rotated in relation to the bottom portion for a sufficient period of time to thoroughly scrub and clean the lens. During this rotation, the top and bottom pads frictionally engage upon each surface of the lens, thereby simultaneously scrubbing them. Once the scrubbing is complete, the top portion of the housing is removed. The contact lens may then be withdrawn from the housing. In a preferred embodiment the pads may be removed or replaced when soiled. As an alternative method of cleansing the lenses, the necessity of dispensing a contact lens cleansing solution into the pads may be eliminated by having the solution already dispensed therein. Another alternative is to battery motorize the system to rotate in one direction or to oscillate.

BRIEF DESCRIPTION OF THE DRAWINGS

FIG. 1 of the drawings is an exploded side cut-away view of an improved contact lens cleansing apparatus.

FIG. 2 of the drawings is a side cut-away view of an improved contact lens cleansing apparatus.

FIG. 3 is a top view of the bottom portion of an improved contact lens cleansing apparatus showing in particular an offset dome member with a contact lens placed thereon.

FIG. 4 of the drawings is a schematic view of the use of an improved contact lens cleansing apparatus.

DETAILED DESCRIPTION OF THE DRAWINGS

While this invention is susceptible of embodiments in many different forms, there is shown in the drawings and will herein be described in detail, several specific embodiments, with the understanding that the present disclosure is to be considered as an exemplification of the principles of the invention, and is not intended to limit the invention to the embodiments illustrated.

Improved contact lens cleansing apparatus 10, as shown in FIG. 1, comprises housing means 12 for containing a contact lens 14. The housing means includes a top portion 16 and a bottom portion 18 which are both removable and movable in relation to each other. Contained within housing means 12 are scrubbing pad means 20 which scrub contact lens 14 when top portion 16 of housing 12 is moved in relation to bottom portion 18. In particular, top portion 16 of housing means 12 is rotated back and forth on bottom portion 18 thereby effecting a scrubbing action upon the contact lens 14 contained within housing means 12. Housing means 12 further includes an offset dome member 22 which insures uniform cleansing of the entire lens surface.

In order to rotate top portion 16 on bottom portion 18, housing means 12 includes shoulder 17 built into top portion 16 and rim 19 built into bottom portion 18. Top portion 16 through shoulder 17, rests on rim 19 as top portion 16 is rotated back and forth. The positioning also prevents contact lens 14 from being damaged if it should migrate off of dome 22 to the inside edge 23 of housing 12.

As shown in FIG. 1, in a preferred embodiment, housing means 12 includes selective attachment means 24. These attachment means retain pad means 20 in contact with housing means 12. However, pad means 20 may be removed as desired when soiled.

In a preferred embodiment, pad means 20 comprises a top pad 26 attached to top portion 16 of housing means 12 and a bottom pad 28 attached to bottom portion 18 of housing means 12. Upon the movement of top portion 16 of housing means 12, top pad 26 frictionally engages with bottom pad 28. Contact lens 14 is placed on dome 22 and is contained therebetween. Thus, the frictional engagement of top pad 26 and bottom pad 28 effects the scrubbing action upon contact lens 12 thereby cleansing the lens 14. In order to scrub the lens without damaging it, pad means 20 is comprised of a cellular plastic foam material, preferably, polyurethane foam. This polyurethane foam may either be reticulated or non-reticulated as desired. In a preferred embodiment, top pad 26 is approximately $\frac{1}{8}$" thick and bottom pad 28 is approximately $\frac{1}{4}$" thick. These specifications effectively cushion contact lens 14 while at the same time effecting a substantial and consistent scrubbing action and pressure upon contact lens 14.

As shown in FIG. 2 of the drawings, in order to clean a contact lens, a contact lens solution (not shown) is dispersed into bottom pad 28 within housing means 12. As an alternative method, the cleansing solution may already be integrally dispersed into the pad. Contact lens 14 is then placed on pad 28 within housing means 12. Bottom portion 16 of housing means 12 is then joined with top portion 18. Contact lens 14 is positioned to rest upon the portion of pad 28 which is situated on dome 22. Contact lens 14 is thereby sandwiched between top pad 26 and bottom pad 28. This is important in that the lens could be damaged if its shape is not retained during cleaning. Top portion 16 of housing means 12 is then rotated in a back and forth motion in relation to bottom portion 18. The back and forth rotation is repeated a sufficient period of time to thoroughly scrub and clean the lens, (i.e. a minimum of 25 repetitions). Top portion 16 of housing means 12 is then removed from bottom portion 18 and contact lens 14 may be withdrawn from housing means 12. Pad means 20 which includes top pad 26 and bottom pad 28 may also be removed and replaced when necessitated by soiling or wear.

As shown in FIG. 3 of the drawings, offset dome member 22 lies on a different axis of rotation than housing means 12. When top portion 16 (not shown) is rotated about bottom portion 18, this off-center location of offset dome member 22 causes contact lens 14 to migrate from one side of the dome to the other usually along axis A—A. If dome member 22 were not offset, the contact lens would tend to remain in the center of the dome and an uncleaned area would result in the center of the lens because of a relative dead spot during the scrubbing action. Dome member 22 prevents this by forcing contact lens 14 to move across dome member 22 due to an equillibrium of symmetrical force, thereby thoroughly cleansing the entire lens.

As shown in FIG. 4 of the drawings, contact lens cleansing apparatus 10 may be easily held and operated manually by the contact lens user. As an additional feature, a tab 30 (FIG. 2) or knob 31 (FIG. 4) may be attached to bottom portion 16 of housing means 12 in order to facilitate back and forth rotation of top portion 16 on bottom portion 18 of housing means 12. Note: The bottom portion 18 has a tab 30 or knob 31 and top portion 16 is flat, so that the patient is induced to place the lens 14 on the dome and not on cocked bottom portion 18.

The foregoing description merely explains and illustrates the invention and the invention is not limited thereto, except insofar as the appended claims are so limited as those skilled in the art who have the disclosure before them will be able to make modifications and variations therein without departing from the scope of the invention.

I claim:

1. An apparatus for the cleansing of contact lens, comprising:
   housing means for containing a contact lens;
   said housing means including a top portion and a bottom portion;
   said top portion being both movable and removable in relation to said bottom portion;
   scrubbing pad means within said top and bottom portions comprising a top pad member in said top portion and a bottom pad member in said bottom portion for the scrubbing of said contact lens when said top portion of said housing is joined to and rotated in relation to said bottom portion of said housing means;
   said housing means further including a circular shoulder member within said top portion and a circular rim member within said bottom portion, said rim member supporting said shoulder member when said top and bottom portions are joined so as to precisely position said top pad means in relation to said bottom pad means and to facilitate back and forth rotation of said top pad means in relation to said bottom pad means whereby a consistent force between said top and bottom pad means and scrubbing action on a contact lens contained therebetween may be effected without damage to said contact lens;

said scrubbing pad means further comprising a cellular non-shredding plastic foam material of such a consistency as to safely scrub a contact lens without damaging said lens while at the same time being of sufficient stiffness to effectively scrub said lens.

2. The invention according to claim 1 in which said housing means further includes:

An offset dome member attached to said bottom portion of said housing means beneath said bottom pad member on an axis offset from the axis of said bottom portion of said housing means whereby when a contact lens is placed on said bottom pad member and when said top and bottom portions of said housing means are joined and rotated back and forth in relation to each other, said dome member is effective to cause a lateral force to be applied against the contact lens thereby causing the migration of the contact lens across said dome member while being scrubbed by said scrubbing pad means thereby thoroughly scrubbing both lens surfaces of the contact lens.

3. The invention according to claim 2 in which said offset dome member is attached to said pad means, said offset dome member being removable and replaceable from said housing means.

4. The invention according to claim 1, further comprising:

cleansing solution means dispersed within said pad means for the washing and disinfecting of the contact lens.

5. The invention according to claim 4 in which said cleansing solution means comprises:

a combination of a saline solution and a surfactant.

6. The invention according to claim 1 in which said housing means includes:

selective attachment means for retaining said pad means as desired, whereby said pad means are disposable when soiled.

7. The invention according to claim 1 in which said cellular plastic foam material comprises polyurethane foam.

8. The invention according to claim 7 in which said cellular polyurethane foam is reticulated.

9. The invention according to claim 1 in which said top pad means is ⅛" thick plus or minus 1/16" and said bottom pad is ¼" thick plus or minus 1/16" in order to effectively transmit a consistent programmed force between said top and bottom pad means against said contact lens when operating said apparatus, thereby scrubbing said lens without damaging it.

10. The invention according to claim 1 in which said pad means are removable and replaceable in said housing means when soiled.

11. The invention according to claim 1 in which said offset dome member is integrally formed in said bottom pad member.

* * * * *